US00RE38108E

(19) United States
(12) Reissued Patent
Chee et al.

(10) Patent Number: US RE38,108 E
(45) Date of Reissued Patent: May 6, 2003

(54) COMPUTER SYSTEM WITH VIDEO DISPLAY CONTROLLER HAVING POWER SAVING MODES

(75) Inventors: Lawrence Chee, Vancouver (CA); Brett Cheng, Vancouver (CA); Kevin Gillett, Richmond (CA); Juraj Bystricky, Richmond (CA); David Tucker, Vancouver (CA)

(73) Assignee: Seiko Epson Corporation, Tokyo (JP)

(21) Appl. No.: 09/816,855

(22) Filed: Mar. 22, 2001

Related U.S. Patent Documents

Reissue of:
(64) Patent No.: 5,886,689
Issued: Mar. 23, 1999
Appl. No.: 08/872,244
Filed: Jun. 10, 1997

U.S. Applications:
(63) Continuation of application No. 08/487,121, filed on Jun. 7, 1995, now abandoned.

(51) Int. Cl.[7] ..... G06F 1/32
(52) U.S. Cl. ..... 345/212; 713/323; 713/324
(58) Field of Search ..... 345/212, 211; 713/323, 324, 320, 321, 322; 455/38.2, 343

(56) References Cited

U.S. PATENT DOCUMENTS

| | | | | |
|---|---|---|---|---|
| 5,167,024 A | | 11/1992 | Smith et al. | 713/322 |
| 5,218,704 A | | 6/1993 | Watts, Jr. et al. | 713/322 |
| 5,230,074 A | | 7/1993 | Canova, Jr. et al. | 714/14 |
| 5,369,771 A | | 11/1994 | Gettel | 713/322 |
| 5,390,293 A | | 2/1995 | Nishioka et al. | 345/593 |
| 5,396,635 A | | 3/1995 | Fung | 713/323 |
| 5,448,262 A | | 9/1995 | Lee et al. | 345/212 |
| 5,483,464 A | | 1/1996 | Song | 713/300 |
| 5,521,854 A | * | 5/1996 | Kadowaki et al. | 713/321 |
| 5,696,978 A | * | 12/1997 | Nishikawa | 713/324 |
| 5,886,689 A | | 3/1999 | Chee et al. | 345/212 |
| 5,926,404 A | * | 7/1999 | Zeller et al. | 713/321 |

FOREIGN PATENT DOCUMENTS

| | | | |
|---|---|---|---|
| EP | 0 419 910 | 4/1991 | G06F/3/14 |
| WO | 94/12969 | 6/1994 | G09G/1/00 |

* cited by examiner

*Primary Examiner*—Raymond J. Bayerl
(74) *Attorney, Agent, or Firm*—Mark P. Watson

(57) ABSTRACT

A computer system includes an operator input device, a central processing unit (CPU), and a display device, such as a liquid crystal display (LCD) or cathode ray tube (CRT) providing a visible image to the computer user as an output of computer activity. The computer system includes a video display controller (VDC) with a graphics generator. This VDC receives image information, such as text or graphics generated by the CPU, or retrieved by the CPU from another facility (such as a CD-ROM) of the computer system, and responsively provides image signals driving the CRT or LCD display. The VDC includes a power saving controller implementing one of several available power saving modes dependent upon one or more of several possible inputs. Each of the power saving modes includes the same list of VDC functions which may individually be enabled or disabled in each power saving mode dependent upon a bit value entered into a register of the power saving controller. Each of the power saving modes is ranked with the others in an order of succession. Accordingly, when each mode of power saving is enabled, it disables the lower-ranked modes of power saving. In turn, each mode of power saving is disabled and succeeded if a higher-ranked mode is enabled.

40 Claims, 4 Drawing Sheets

| FUNCTION / MODE | 1 | 2 | 3 | 4 | 5 | 6 | 7 | 8 |
|---|---|---|---|---|---|---|---|---|
| | MCLK | P CLK | LCDBL | DPMS BIT(1) | DPMS BIT(0) | DISPLA Y OFF | P CLK SLOW | REDUCE G.S. |
| PSM 1 | 1 OR 0 | 1 OR 0 | 1 OR 0 | 1 OR 0 | 1 OR 0 | 1 OR 0 | 1 OR 0 | 1 OR 0 |
| PSM 2 | " | " | " | " | " | " | " | " |
| PSM 3 | " | " | " | " | " | " | " | " |
| PSM 4 | " | " | " | " | " | " | " | " |

1=ENABLED 0=DISABLED

| FUNCTION / MODE | 1 | 2 | 3 | 4 | 5 | 6 | 7 | 8 |
|---|---|---|---|---|---|---|---|---|
| | MCLK | P CLK | LCDBL | DPMS BIT(1) | DPMS BIT(0) | DISPLA Y OFF | P CLK SLOW | REDUCE G.S. |
| PSM 1 | 1 OR 0 | 1 OR 0 | 1 OR 0 | 1 OR 0 | 1 OR 0 | 1 OR 0 | 1 OR 0 | 1 OR 0 |
| PSM 2 | " | " | " | " | " | " | " | " |
| PSM 3 | " | " | " | " | " | " | " | " |
| PSM 4 | " | " | " | " | " | " | " | " |

1=ENABLED 0=DISABLED

FIG.-4

| DPMS | | STAT E | V SYNC | H SYNC |
|---|---|---|---|---|
| BIT 1 | BIT 0 | | | |
| 0 | 0 | ON | + | + |
| 0 | 1 | STND BY | + | - |
| 1 | 0 | SUSPEND | - | + |
| 1 | 1 | OFF | - | - |

FIG.-5

COMPUTER SYSTEM WITH VIDEO DISPLAY CONTROLLER HAVING POWER SAVING MODES

Matter enclosed in heavy brackets [ ] appears in the original patent but forms no part of this reissue specification; matter printed in italics indicates the additions made by reissue.

This is a Continuation of application Ser. No. 08/487,121 filed Jun. 7, 1995, now abandoned.

CROSS REFERENCE TO RELATED APPLICATION

The subject matter of the present application is related to subject matter disclosed in U.S. patent application Ser. No. 08/487,117, entitled "Computer System with Display", in application Ser. No. 08/485,876, entitled "Display FIFO Module including a Mechanism for Issuing and Removing Requests for DRAM Access", and in U.S. patent application Ser. No. 08/486,796, entitled, "Computer System with Double Simultaneous Displays Showing Differing Display Images", all filed on the same day and assigned to the assignee of the present application.

BACKGROUND OF THE INVENTION

1. Field of the Invention

The present invention relates generally to a computer system with a display device, such as a cathode ray tube (CRT) or liquid crystal display (LCD), for example. The display device provides a user of the computer system with a visible display of computer data, such as test or graphics. More particularly, the present invention is in the field of such a computer system having a Video Display Controller (VDC) including a graphics generator. The VDC receives image information, such as text or graphics generated by a processor (CPU) or retrieved by the CPU from another facility (such as a CD-ROM) of the computer system, and provides signals driving the CRT or LCD display. The computer system may be a battery-powered portable device. Still more particularly, the present invention is in the field of a VDC having a power saving mode for responding to both hardware inputs (such as a contact closure input, for example) and also to a software input to effect a reduction in power consumption within the VDC and the computer system as a whole.

2. Related Technology

A conventional power manager for a portable laptop computer is known in accord with U.S. Pat. No. 5,167,024 (hereinafter, the '024 patent), issued 24 Nov. 1992 to R. Steven Smith, et. al. According to the '024 patent, a power manager for a laptop computer provides power management and clocking control to various units of the computer. Switches control the distribution of power to the various units of the computer. When any of these various units are not needed, the switches are used to remove power or clock signals, or both, from particular units of the computer. The power manager allows the computer to be in any one of four states varying from "on" and active, to "on" in a "sleep" state with power and/or clock signals removed from certain units, to "on" in an "intermediate" or "slow" state in which the clock rate of the computer is reduced to result in a power saving. The fourth state for the computer system is "off".

With a power manager as disclosed in the '024 patent, a system designer is limited to three functional modes for the computer, only two of which are modes with reduced power consumption. Further, the system criteria which will initiate one of the two modes of reduced power consumption are relatively limited.

Another conventional real-time power conservation apparatus for portable computers in known in accord with U.S. Pat. No. 5,218,704 (hereinafter, the '704 patent), issued Jun. 8, 1993 to LaVaughn F. Watts, Jr., et. al. According to the '704 patent, a real-time power conservation apparatus for a portable computer employs a monitor to determine whether a computer may rest based upon CPU activity. A hardware device carries out the result of the monitor's determination. Again, with this conventional power conservation apparatus, the system designer options as to how power conservation expedients are to be implemented are limited.

Yet another conventional power management system for a battery-operated, computer is known in accord with U.S. Pat. No. 5,230,074 (hereinafter, the '704 patent), issued Jul. 20, 1993, to Francis J Canova, Jr., et.al. According to the '074 patent, a battery-operated computer includes two processors, a main processor, and a processor which manages power receipt (battery charging) and power usage within the computer. The system designer using the power management system taught by the '074 patent would be constrained to configure the power management options of a computer system according to the choices allowed by the teaching of this patent.

Two more recent conventional power saving or power conservation apparatus are known in accord with U.S. Pat. Nos. 5,369,711; and 5,396,635, issued 29 Nov. 1994, and 7 Mar. 1995, respectively, to Steven J. Gettel, and Henry T. Fung, also respectively. These teachings both employ software routines to control a monitor for determining which of available power conservation or power saving expedients are to be implemented. A user of either one of these power saving expedients will be required to select from among a limited field of power saving configurations for each mode of operation of the computer system. Also, implementation of these power saving apparatus is rather complex, requiring use of separate power management IC.

Accordingly, a long-felt need has been recognized in the field of battery-operated portable computers for such a computer system which has both a high level of graphics generating capabilities and an economy of operation effected by a power saving facility of the VDC of the computer system which results in a comparatively long battery-powered service life between battery recharging.

SUMMARY OF THE INVENTION

In view of the deficiencies of the conventional technology, an object for this invention is to provide a computer system with a video display controller avoiding one or more of these deficiencies.

Another object for this invention is to provide such a computer system with a video display controller (VDC) receiving image information, such as text or graphics, and providing signals driving a display.

Yet more particularly, the present invention has as an object the provision of a portable batter-powered computer system with a VDC having its own power saving facility.

Still more particularly, the present invention has as an object the provision of such a VDC for a portable battery-operated computer system which provides a system designer with a variety of optional power saving modes which may individually be configured as the system designer wishes, and which are implemented individually or sequentially, dependent upon system operation parameters and user conduct.

Accordingly, the present invention provides a computer system including an input device for receiving inputs from a user; a central processing unit (CPU) interfacing with the input device and responding to the inputs by performing a processing function producing an output; an output device receiving the output response from the CPU and providing a sensible output response; the output device including a display device providing a visible image to the user in response to the output response; a video display controller (VDC) interfacing with the CPU and providing driving signals to the display device, the VDC including a power saving controller, the power saving controller including a register providing a plurality of power saving modes, each power saving mode including a plurality of functions of the VDC each of which are individually enabled or disabled when the respective power saving mode is activated dependent upon a bit value entered into a respective location on the register.

As a result, a system designer can configure a computer system using the present VDC as is desired to implement a variety of differing power saving modes, dependent for example, on the selection of components included in the computer system. Each of the available power saving modes allows the system designer a complete choice of which functions of the computer are to remain enabled and which are to be turned off or modified in response to activation of each power saving mode. Virtually the only restraint imposed on the system designer is the order of succession of the various modes. The power saving modes are ranked in succession, and when a higher ranking mode is activated the lower ranked modes of power saving are succeeded. Additional objects and advantages of the present invention will be apparent from a reading of the following detailed description of particular preferred embodiments of the present invention, taken in conjunction with the appended drawing Figures, in which like reference numeral indicate the same feature, or features which are analogous in structure or function.

BRIEF DESCRIPTION OF THE DRAWING FIGURES

FIG. 1 provides a pictorial presentation of a portable battery-powered computer system configured as a notebook type computer having a LCD display which providing a visible image representative of computer output to a user of the computer system;

FIG. 2 is a schematic functional block diagram of the computer system seen in FIG. 1;

FIG. 3 provides a schematic functional block diagram of the video display controller (VDC) of the computer system seen in the preceding figures;

FIG. 4 is a tabulation of the four variable-configuration power saving modes which may be implemented by the VDC seen in FIG. 3;

FIG. 5 is a tabulation of alternative configurations for a CRT display power management system created by outputs from the power saving modes of the present invention, which modes may be selected alternatively.

DETAILED DESCRIPTION OF A PREFERRED EXEMPLARY EMBODIMENT OF THE INVENTION

Figure 1:
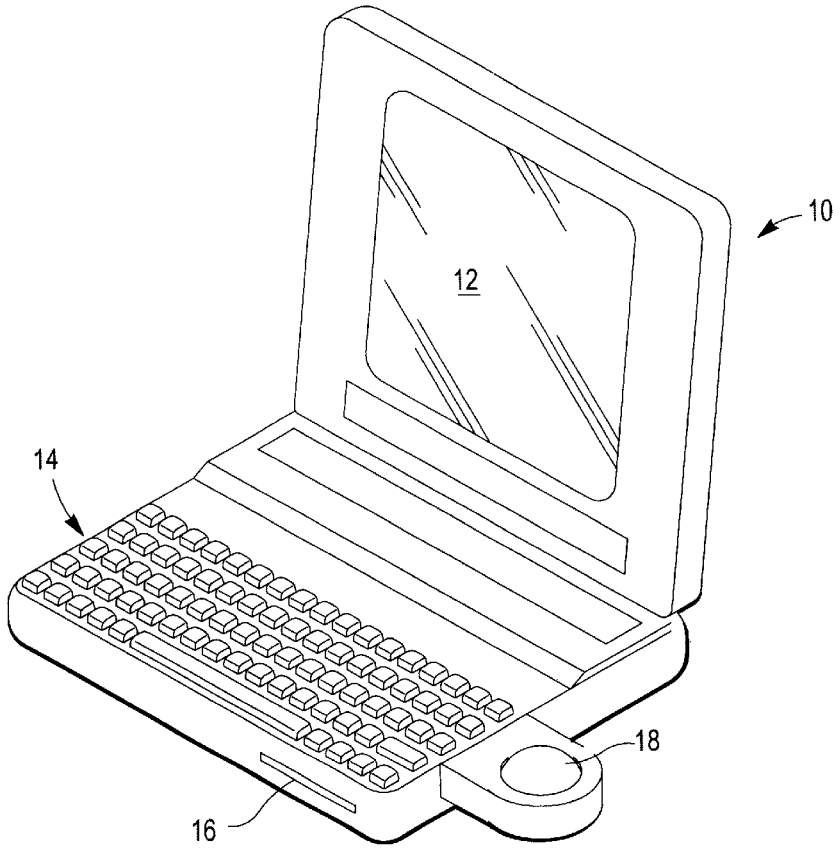

Viewing FIG. 1, a computer system 10 of notebook configuration includes a liquid crystal display (LCD) 12. The display 12 provides a visible image as an output of computer data to a user (not seen in the drawing Figures) of the computer system 10. The notebook computer includes various input devices, such as a keyboard 14, a floppy disk drive 16, and a track ball 18. Those ordinary skilled in the pertinent arts will recognize that the track ball is essentially a stationary mouse input device. The computer system 10 may include additional input devices, such as a hard disk drive a CD-ROM, and a serial input-output (I/O) port. Several of these devices also function as output devices for the computer system 10 in addition to the liquid crystal display 12. Alternatively, the computer system 10 may be interfaced with a conventional cathode ray tube (CRT) monitor (not seen in the drawing Figures), which uses RGB signals provided by the computer system 10, and which is used to provide a visible image to the user of the computer system instead of the LCD 12. The CRT display would provide a larger size of display for the user of the computer system than does the LCD 12.

Figure 2:
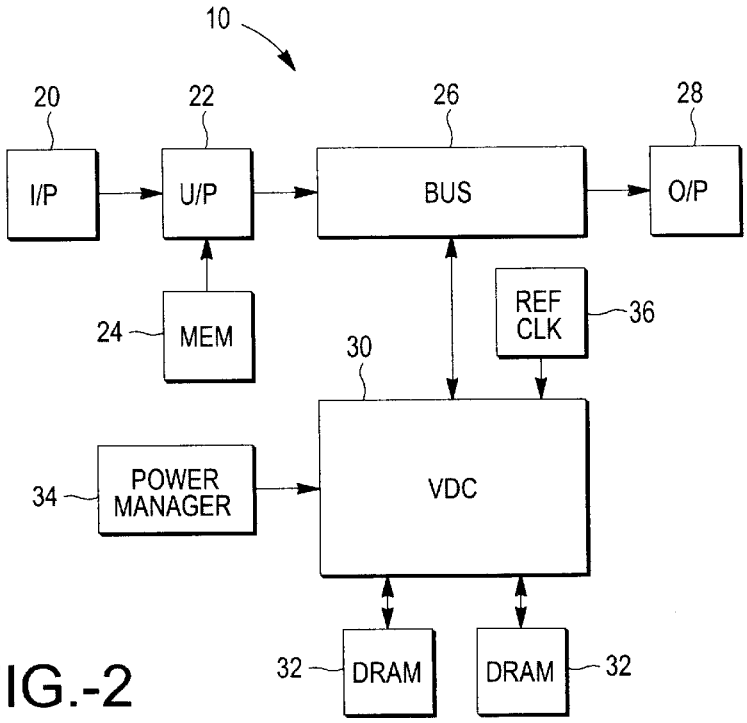

FIG. 2 provides a schematic block diagram of the computer system 10, with the input devices all subsumed within one representative block 20. The input devices are interfaced with a microprocessor 22, which also has an interface with a memory facility 24. The memory facility 24 will include the floppy disk drive 16, and may include a hard disk drive, CD-ROM, and other devices. A data bus 26 interfaces with the microprocessor 22 and provides an interface with the output devices, including the LCD, and possibly with a CRT image display devices, as described above. The other output devices for the computer system 10 are subsumed in a representative block 28. In order to facilitate the interface with the LCD 12, or other image display device, such as a computer monitor, the computer system 10 includes a video display controller (VDC) 30 interfacing with the bus 26, and providing driving signals for the LCD 12, and also for a CRT as an alternative to the LCD 12. The VDC has an interface with dynamic random access memory (DRAM), represented on FIG. 2 with the schematic blocks 32. Also, the VDC has an interface with a power management facility 34 of the computer system 10. A reference clock 36 provides a reference clock rate to the VDC 30.

Figure 3:
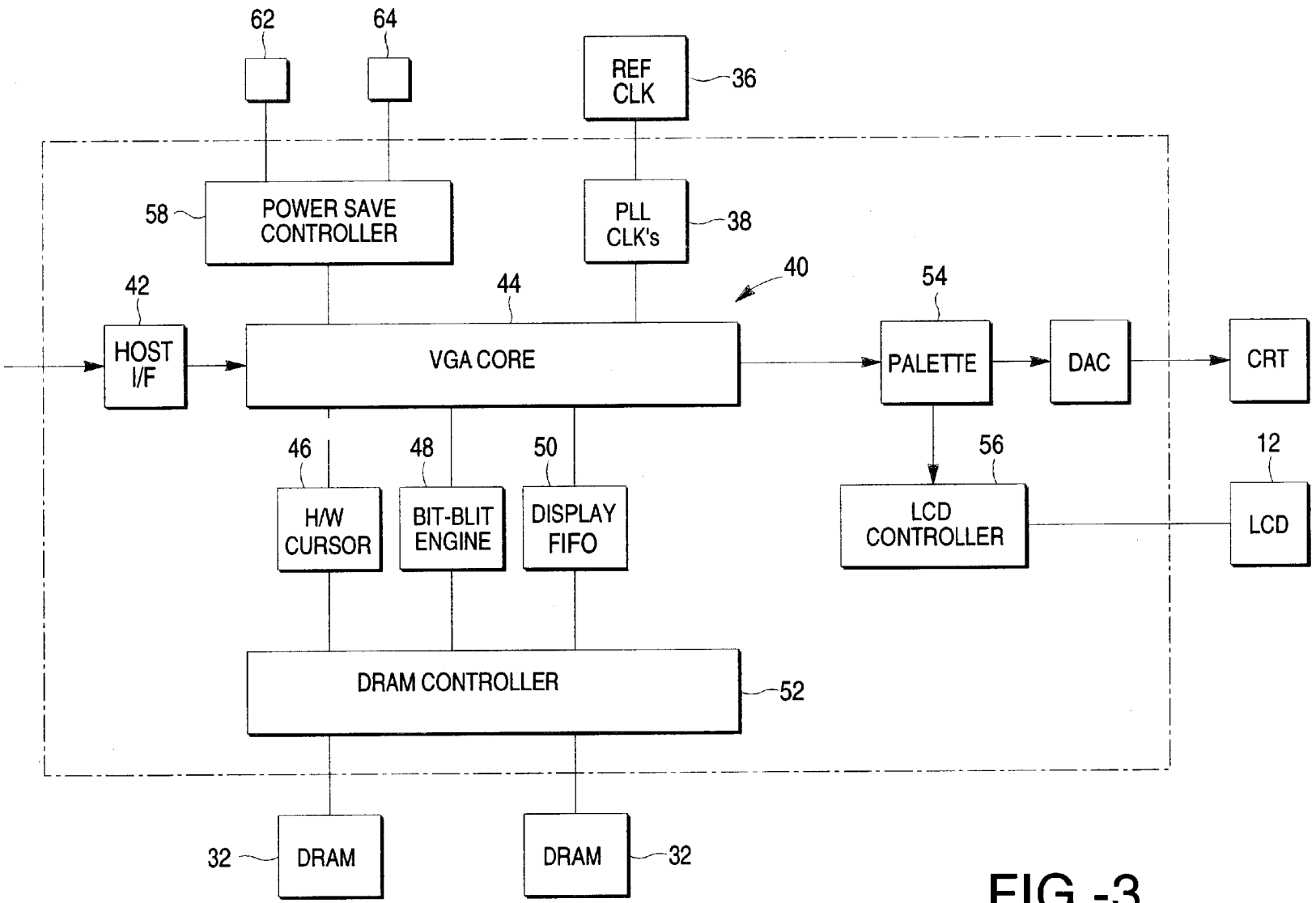

Turning now to FIG. 3, it is seen that the VDC 30 includes an internal clock generator 38 referenced to the clock signal from reference clock generator 36, and providing clock signals to a video section 40 of the VDC. The clock signals provided by internal clock 38 may include a pixel clock (Pc1k) and a memory clock (Mc1k), the use of which will be further explained below. In order to interface the video section 40 with the bus 26, and hence with the microprocessor 22, the video section 40 includes a programmable host interface 42. The host interface 42 is programmable to configure the VDC 30 for interface with a number of conventional bus configurations. For example, host interface 42 may be configured for interface with a conventional Intel 486DX local bus, with a VL-Bus, and with a PCI interface bus. The host interface 42 interfaces the bus 26 with a VGA core portion 44 of the VDC 30. This VGA core portion 44 includes a sequencer, to be further described below, a cathode ray tube controller (CRTC), a graphics controller, an attribute controller, and conventional VGA circuitry.

In order to allow the VGA core 44 to generate and control the text, graphics and other visual characters (such as a cursor and icons, for example) to be displayed on the LCD 12 (and alternatively, on a CRT), the VGA core 44 is interfaced with a hardware cursor generated 46, a bit-BLT engine 48, and a display FIFO 50. The bit-BLT engine 48 provides for block transfers of bits generated to provide graphics and other such visual characters on the screen of LCD 12 (or on a CRT). More specifically, the bit-BLT engine performs read, write, and block transfers of bits representing these, characters, solid fills, destination inversions, and pattern fills. The bit-BLT performs all data alignment and masking at the boundaries of block transferred characters, as well as text expansions to accelerate the writing of monochrome images. The display FIFO 50 temporarily stores bits of information, in integer multiples of double-word size units or levels, awaiting the writing of these bits to pixels of the LCD display 12 (or to a CRT). Preferably, the display FIFO 50 is an eight-stage FIFO, storing eight 32-bit double-words of display information for sending to the LCD 12 (or CRT).

Each of the hardware cursor generator 46, bit-BLT 48, and display FIFO 50 are also interfaced with a DRAM controller 52, which includes a DRAM sequencer and controller (SEQC). This DRAM controller 52 arbitrates and implements requests for access to the DRAM 32 by various functional units of the computer system 10, including other portions of the VDC 36. As is seen in FIG. 3, the DRAM controller 52 has a interface with the DRAM 32. For purposes of simplicity of illustration, the DRAM 32 is shown in FIG. 3 as a single functional block. However, those ordinarily skilled in the pertinent art will recognize that this DRAM may comprise one or several DRAM chips. The display FIFO 50 has an interface (via the VGA controller 44 and DRAM controller 52) with a palette controller 54, a digital analog converter DAC 100, CRT 101, and a liquid crystal display (LCD) interface controller 56. The palette controller 54 implements the standard 256-by-18 VGA palatte, while the LCD interface controller 56 performs frame modulations and dithering for 64 shades of grey in monochrome mode operation; and 4K colors, with dithering for a full 256K colors in color mode operation of the LCD 12 DAC 100 performs conventional digital to analog conversion of video signals to enable image display on a conventional analog CRT 101.

In order to complete this explanation of the structure represented in FIG. 3, it will be noted that the VDC 30 includes a power saving controller 58. This power saving controller 58 has a generalized interconnection with the video section 40 of the VDC 30 in order to implement power saving features of the VDC. Also, the power saving controller 58 has an interface with the LCD 12 (via the VGA core 44) in order to facilitate such power saving functions as LCD back light "off", and LCD display "off", under control of parameters set both by the system designer and by the user of the computer system 10, as will be further explained below.

FIG. 4 provides a graphical representation of a four-level or four-mode register 60 within the power saving controller 58. Each row of the tabulation represents a particular power saving mode, designed variously as power saving mode #1 (PSM 1), etc. The PSM mode modes are ranked according to their order of succession, with the highest ranked mode at the bottom of the table of FIG. 4, and the lowest ranked mode at the top of this table. The arrow along the side of the tabulation of FIG. 4 provides a indication of the succession order, with the arrow pointing toward the higher ranking modes. This register 60 is accessible to a system designer configuring the VDC 30 for use in a particular computer system 10. The system designer need only enter a "1" value into the register 60 at a particular row and column location to implement a particular feature, or a "0" to inactivate that particular feature for each of the four modes of power saving provided.

A programmable watch dog timer of the controller 58 (which will be familiar to those ordinarily skilled in the pertinent arts) counts down a selected time interval of inactivity within the VDC 30. If during a count down interval any activity is detected, then the count down is started over again. Inactivity is determined by all of the absence of signal level change at one of a pair of external signal input pins (to be identified further), or by the absence of memory accesses and I/O accesses during a selected time interval. The external signal input pins (seen as pins 62 and 64 in FIG. 3) requires a signal level change from a signal-high value to a signal-low value, or vice versa, in order to cancel an existing inactivity countdown and to start a new countdown of the selected time interval.

By way of example only, the signal level at one of the input pins 62 or 64 may be responsive to an external switch indicating a closure of the case of the notebook computer 10 by a user. In the event that the user of the computer 10 closes the case without turning off the computer, the system designer may wish to provide for the saving of the states of the VDC 30 and the reduction of power consumption to a minimal level. In this case, when the user re-opens the case (assuming that battery power has not run completely out while the case has been closed) the computer will return to its previous condition at the moment the case was closed. The signal level at the other of the two input pins 62 and 64 may be responsive, for example, to a switch closure indicating a shutdown of the computer system by the user. Inactivity is also indicated by the absence of memory or I/O accesses during the countdown interval, as mentioned above. Further to the above, the power saving controller 58 provides for the system designer to select from among a wide range of possible power saving configurations for the VDC 30.

Viewing FIG. 4, it is seen that each of the four levels of power saving (numbered PSM1 through PSM4, with the order of succession beginning toward the top of FIG. 4) provides for the system designer to select from among the same full range of alternatives to be implemented in each of the four modes or levels of power reduction which may be effected in the VDC 30. Power saving modes 1 and 4 are each responsive to a respective one of the two input pins 62 and 64 so that the lowest and highest modes in the scheme of succession is controlled by an external hardware input (i.e., by a switch control closure input, for example). Each of these two levels or modes of power saving also shuts down the interface with bus 26 completely. The intermediate two levels of power saving mode (i.e., modes PSM2 and PSM3) are respective to software inputs. That is, power saving mode #2 and power saving mode #3 (in order of succession) are each responsive to a respective software input.

Consequently, these two power saving modes may be implemented by any one of the conventional software-based activity monitoring and power saving schemes, such as one of those conventional schemes or systems described above. By order of succession is meant that each power saving mode succeeds over any mode below it in rank as presented in the tabulation of FIG. 4. When a particular power saving mode of superior rank is activated, the features of any of the other lower-ranked modes which may have been previously activated are inactivated. By way of example, if power saving mode #3 is implemented, and the user implements power saving mode #4 by closing the computer case or turning off the computer system 10, for example, then mode #4 succeeds over mode #3. When the user re-opens the computer case, power saving mode #3 may still be in effect.

However, if power save mode #1 has been implemented, then mode #2 (or any other higher ranked mode) can succeed over mode #1 if the resident software power use monitoring program (or a hardware input) determines that mode #2 should be implemented. It will be understood that the resident power use monitoring program will be selected by the system designer and will simply provide an input to the power saving controller 60 of the VDC 30 in order to implement a mode of power saving selected and configured by the system designer.

Moreover, each of the four levels of power saving mode provides a column 1 for the Mc1k to be turned off, while column 2 provides for the Pc1k to be turned off. Column 3 provides for the LCD 12 to have its back light turned off when a particular mode of power saving (i.e., mode PSM1, PSM2, PSM3, or PSM4) is implemented. The bit value in column #3 has no effect if the computer system 10 is driving a CRT display rather than a LCD display. Columns 4 and 5 provide for the system designer to select from among several different CRT display power management system (DPMS) configurations for the computer system 10 when this computer is driving a CRT display, as was explained above as a possibility for the computer system 10. The bit entry in column 4 is bit "1" for the DPMS configuration, while the bit entry in column 5 is the "0" bit for DPMS configuration.

Turning for a moment to FIG. 5, it is seen that if both bits "1", and "0", are 0, then the CRT display will be "on",with both vertical (VSYNC) and horizontal (HSYNC) synchronization signals provided. If the "1" bit is 0, while the "0" bit is 1, then the CRT display will be in "standby" mode, with vertical (VSYNC) synchronization signal being provided, but with the horizontal (HSYNC) synchronization signal being at a direct current (zero volts) level. In this case, the CRT screen will be blank. Conversely, if the "1" bit is 1, while the "0" bit is 0, then the CRT display will be in "suspend" mode, with vertical (VSYNC) synchronization signal being at a zero volts level, but with the horizontal (HSYNC) synchronization signal being provided. Again, the CRT screen will be blank. Finally, if both the "1" bits is 0, and the "0" bit is 0, then the CRT display will turned off, with neither the vertical (VSYNC) synchronization signal being provided, nor with the horizontal (HSYNC) synchronization signal being provided, and with both of these signals being at a direct current (zero volts) level. The bits in columns 4 and 5 have no effect if the computer system 10 is driving a LCD instead of a CRT.

Returning to FIG. 4, it is seen that column 6 provides for the system designer to select that the LCD display 12 can be turned "OFF". When "display off" is selected by placing a "1" in column 4, in any row (i.e., in any mode of power saving), then when that mode is enabled all of the functions contributing to the display of a visible image on the LCD 12 or on a CRT are shut off. That is, the display FIFO 50, hardware cursor 46, frame buffer, and pixel grey-scale circuits (both of the LCD controller 56), all become dormant. The VGA palette is shut down, while full CPU access to this palatte is maintained. If the computer system is driving a CRT then the DAC is powered down, and the RGB signals are set to ground level.

Column 7 provides for the pixel clock (Pc1k) to be slowed to a pre-defined lower frequency. Power consumption by the LCD and other image display circuitry of the computer system 10 is proportional to frequency of the pixel generation and display. The image displayed during this mode of power saving may have a perceptible but acceptable level of flicker. This bit in column 7 has no effect when the computer system 10 is driving a CRT rather than the LCD display 12.

Finally, column 8 provides for the display 12 to be written at a reduced gray scale, so that the number of bits per pixel of the display is considerably reduced and the burden on the VDC is commensurately reduced.

Figure 6:
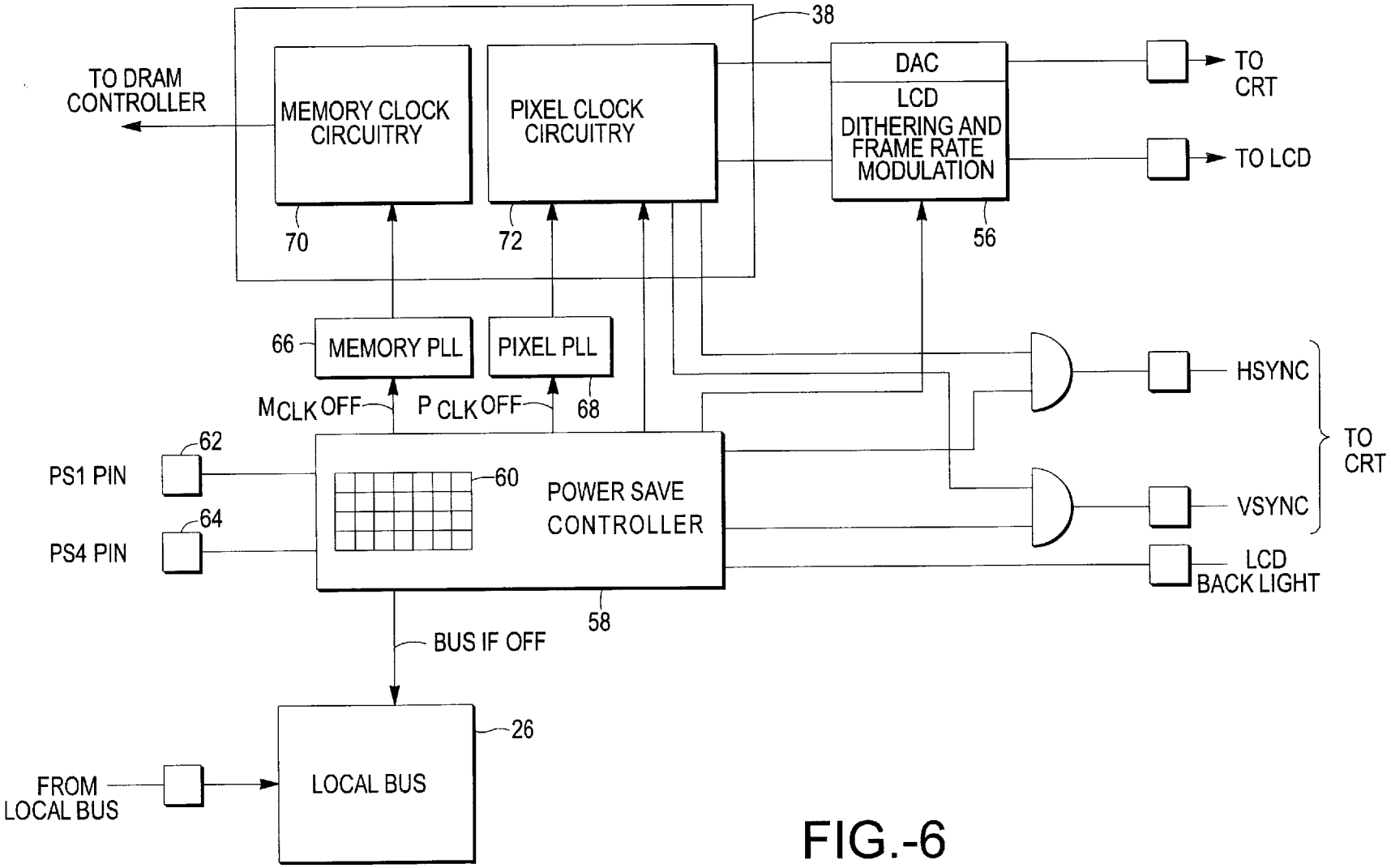
FIG. 6 provides a functional block diagram of a power saving controller and its interconnection in the computer system seen in the preceding drawing Figures.

FIG. 6 provides a functional block diagram of the internal architectural features of the VDC which provide for the implementation of the power saving modes discussed above. Viewing FIG. 6, it is seen that the power saving controller 58 of the VDC 30 includes interface with the local bus 26 so that local bus activity and memory accesses can be sensed and responded to by the watch dog timer function discussed above. The presence and functionality (as well as the structure) of the register 60 seen in tabular form in FIG. 4 is functionally referenced on FIG. 6 with the sub-divided box and numeral 60. It is seen that the power saving controller 58 has an interface with two phased locked loop (PLL) timers 66 and 68, which respectively perform the functions of providing a memory clock (Mc1k), and of providing a pixel clock (Pc1k). The memory clock timer 66 interfaces with a memory clock circuit 70 for providing a control over the rate at which data is written to and read from the DRAM 32, for example. Similarly, the pixel clock timer 68 interfaces with a pixel clock circuit 72 for controlling the rate at which pixels of which data (at a certain rate of bits-per-pixel dependent upon display mode) are written to the display 12 (or to a CRT display).

This pixel clock circuit 72 interfaces with both the CRT controller and with the LCD controller 56. In order to provide for the retention of an image on the LCD at a reduced grey-scale, the power saving controller 58 also has an interface with the LCD controller 56, which when implemented requires this LCD controller to provide an image in a reduced scale of shades of grey (i.e., two bit grey scale, for example). In this way, if the user of the computer system 10 is using a monochrome graphics mode for example, with a certain palette of grey-scale levels, and a sufficiently long period of inactivity is sensed, then the LCD will be ordered to provide a grey-scale image of reduced shading levels. This shift from full-palette image to an image of reduced grey-scale level saves considerably on power consumption compared to provided the color image. The reduced grey-scale image provides pixels which are black or white or 50% black/white (grey). Consequently, the user may not be able to perceive all parts of an image originally rendered in color when this image is rendered in the reduced grey-scale. However, the user need only perform some activity which cancels this power saving mode in order to return the display to full color. For example, the user need only touch a key of the keyboard 14, for example, in order to return the display 12 to its full-color mode.

Of course it will be obvious to those of ordinary skill in the relevant art, after study of the description set forth above in conjunction with the drawings, that principles, features and methods of operation of the described power saving apparatus and methods may be readily applied to other systems and devices, including but not limited to intelligent devices incorporating a display, embedded micro-controllers incorporating a user display, and intelligent input/output processing mechanisms including a display.

While the present invention has been depicted, described, and is defined by reference to particularly preferred embodiments of the invention, such reference does not imply a limitation on the invention, and no such limitation is to be inferred. The invention is capable of considerable modification, alteration, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

We claim:

1. A computer system comprising:

an input device for receiving an input from a user;

a central processing unit (CPU) interfacing with said input device and responding to said input by performing a processing function producing an output;

an output device receiving said output from said CPU and providing an externally perceivable output response;

said output device including a display device providing a visible image to the user in response to said output response;

a video display controller (VDC) interfacing with said CPU and providing driving signals to said display device, said VDC including a power saving controller, said power saving controller including a register having multiple, independently addressable register levels, at least two of said register levels defining at least two externally programmable power saving modes respectively, at least a remaining one of said register levels defining a hardware-activated power saving mode, each of said power saving modes controlling a plurality of power-consuming functions of said VDC, each of which plurality of functions are individually enabled or disabled when a current one of said power saving modes is selected according to a predetermined mode hierarchy and external input comprising at least one of user input received from said input device and a hardware state change depending on the contents of said register.

2. The computer system of claim 1, wherein said register includes a first register location for representing the state of a memory clock timer which is either enabled or shut off dependent upon a bit value entered in said first register location for each of said power saving modes.

3. The computer system of claim 1, wherein said register includes a second register location representing an activation state of a pixel clock timer which is either enabled or shut off dependent upon a bit value entered in said second register location for each of said power saving modes.

4. The computer system of claim 3, wherein said register includes a third register location representing a frequency selection state of said pixel clock timer, said pixel clock timer operating at either a full frequency or at a reduced frequency dependent upon a bit value entered in said third register location for each of said power saving modes.

5. The computer system of claim 1, wherein said display device includes a liquid crystal display, said register including a fourth register location representing an activation state of backlighting for said liquid crystal display device, said backlighting being either enabled or shut off dependent upon a bit value entered in said fourth register location for each of said power saving modes.

6. The computer system of claim 1, wherein said register includes a fifth register location for selectively enabling a display disable function, wherein, when enabled by a respective bit value placed in said register at the fifth register locations for each power saving mode, the display disable function disables all circuits of said VDC contributing to the display of a visible image by said computer system when the respective power saving mode is implemented.

7. The computer system of claim 1, wherein said display device includes a liquid crystal display, and said register includes a sixth register location for selectively enabling a grey scale reduction function for said liquid crystal display of said computer system, said grey scale reduction function converting said image to one of a black-and-white or grey scale image when enabled dependent upon a bit value entered in said sixth register location for each of said power saving modes.

8. The computer system of claim 1, wherein said display device includes a cathode ray tube interfaced with said computer system via said VDC, said VDC providing a vertical synchronization signal and a horizontal synchronization signal to said cathode ray tube, said register including a seventh location representing the state of a cathode ray tube display power management system (DPMS), which DPMS enables or disables one of said vertical synchronization signal and said horizontal synchronization signal provided to said cathode ray tube by said VDC dependent upon a bit value entered in said seventh register location for each of said power saving modes.

9. The computer system of claim 8, wherein said register includes eighth and ninth register locations collectively representing the state of said cathode ray tube display power management system (DPMS).

10. A method of operating a computer system having an input device for receiving an input from a user, a central processing unit (CPU) responding to said user input to perform a processing function producing an output response, and an output device responding to said output response of said CPU to provide an externally perceivable response to the user, said output device including a display device providing a visible image in response to said output response of said CPU, said method including steps of:

providing said computer system with a video display controller (VDC) interfacing with said CPU, having a plurality of functions, and providing driving signals to said display device;

providing said VDC with a power saving controller, and configuring said power saving controller to include a register having multiple, independently addressable register levels, at least two of said register levels defining at least two externally programmable power saving modes respectively, at least a remaining one of said register levels defining a hardware-activated power saving mode, providing for each of said plurality of power saving modes to control selected ones of said plurality of functions of said VDC, and enabling or disabling each of said plurality of functions individually *when* a current one of said power saving modes is selected according to a predetermined mode hierarchy and external input comprising at least one of user input received from said input device and a hardware state change depending on the contents of said register.

11. The method of claim 10, further including the steps of providing said VDC with a memory clock timer, and providing said register with a first register location representing the state of said memory clock timer, and either enabling or disabling said memory clock timer dependent upon a bit value entered in said first register location in each of said power saving modes; and also providing said VDC with a pixel clock timer, and providing said register with a second register location for representing an activation state of pixel clock timer, and either enabling or disabling said pixel clock timer dependent upon a bit value entered in said second register location for each of said power saving modes.

12. The method of claim 11, further including the step of providing said register with a third register location representing a frequency selection state of said pixel clock timer, and either operating said pixel clock timer at a full frequency or at a reduced frequency dependent upon a bit value entered in said third register location in each of said power saving modes.

13. The method of claim 10, further including the steps of providing said computer system with a liquid crystal display as said computer system display device, and providing said register with a fourth register location representing an activation state of backlight for said liquid crystal display, and either enabling or disabling said backlighting of said liquid crystal display dependent upon a bit value entered in said fourth register location for each of said power saving modes.

14. The method of claim 10, further including the steps of providing said register with a fifth register location for selectively enabling a display device disable function, and either disabling or enabling selected ones of said plurality of functions of said VDC contributing to the display of a visible image by said computer system when the respective power saving mode is implemented and dependent upon a bit value in said register at the fifth register locations for each of said power saving modes.

15. The method of claim 10, further including the steps of providing said computer system with a liquid crystal display as said display device, and providing said register with a sixth register location for selectively enabling a grey scale reduction function for reducing a grey scale of said liquid crystal display of said computer system and converting said visible image to either a black-and-white image or to a grey-scale image when said grey scale reduction function is enabled dependent upon a bit value entered in said sixth register location for each of said power saving modes.

16. The method of claim 10, further including the steps of providing said computer system with a cathode ray tube (CRT) as said display device, and employing said VDC to provide a vertical synchronization signal and a horizontal synchronization signal to said CRT, providing said register with a seventh register location representing the state of a cathode ray tube display power management system (DPMS), and either enabling or disabling one of said vertical synchronization signal and said horizontal synchronization signal provided to said CRT by said VDC dependent upon a bit value entered in said seventh register location for each of said power saving modes.

17. The method of claim 16, further including the steps of providing said register with eighth and ninth locations for collectively representing the state of cathode ray tube display power management system (DPMS).

18. A power saving system for a computer capable of performing a plurality of power-consuming operating functions, comprising:

input means for receiving input signals designating multiple independently addressable power saving modes, at least two of said power saving modes being externally programmable and at least a remaining one of said power saving modes being selectable through hardware, said power saving modes being activated according to a predetermined mode hierarchy and a received input signal comprising at least one of user input and a hardware state change, each of said power saving modes specifying power levels for said operating functions;

storage means for storing each of said power saving modes; and control means responsive to the input means for reading one of said power saving modes from the storage means designated by the received input signal, and controlling the computer to operate with said operating functions at said power levels corresponding to said designated power saving mode.

19. A system as in claim 18, in which the storage means comprises a multimode register having separately addressable levels, each level storing a respective one of said power saving modes.

20. A system as in claim 18, wherein the control means inactivates a power saving mode that was previously designated in response to a newly designated power saving mode having a higher mode priority according to the predetermined mode hierarchy.

21. A system as in claim 20, in which the control means re-activates a power saving mode that was previously inactivated in response to removal of a power saving mode having a higher mode priority according to the predetermined mode hierarchy.

22. A system as in claim 20, in which:

the computer comprises a cover, and a switch means activated by the cover;

the switch means generates a first input signal when the cover is closed and a second input signal when the cover is open;

the first and second input signals designate a first power saving mode and a second power saving mode respectively; and said first power saving mode has a higher mode priority than said second power saving mode relative to the predetermined mode hierarchy.

23. A system as in claim 22, in which said first power saving mode has a highest priority, and said second power saving mode has a lowest priority.

24. A system as in claim 18, in which:

the computer comprises a display; and one of said operating functions comprises a display power level.

25. A system as in claim 18, in which:

the computer comprises a display; and one of said operating functions comprises a display grey scale level.

26. A system as in claim 18, in which:

the computer comprises a display; and one of said operating functions comprises generation of a display synchronization signal.

27. A system as in claim 18, in which:

the computer comprises a liquid crystal display; and one of said operating functions comprises generation of liquid crystal back illumination.

28. A system as in claim 18, in which one of said operating functions comprises clock pulse frequency generation.

29. A method of reducing power consumption in a computer capable of performing a plurality of power-consuming operating functions, comprising the steps of:

(a) receiving input signals designating multiple independently addressable power saving modes, at least two of said power saving modes being externally programmable and at least a remaining one of said power saving modes being selectable through hardware, said power saving modes being activated according to a predetermined hierarchy and a received input signal comprising at least one of user input and a hardware state change, each of said power saving modes specifying power levels for said operating functions;

(b) storing each of said power saving modes;

(c) reading one of said power saving modes from the storage means designated by the received input signal; and (d) controlling the computer to operate with said operating functions at said power levels corresponding to said designated power saving mode.

30. A method as in claim 29, in which step (b) comprises storing said power saving modes in respective levels in a multimode register.

31. A method as in claim 30, wherein step (d) further comprises inactivating a power saving mode that was previously designated in response to a newly designated power saving mode having a higher mode priority according to the predetermined mode hierarchy.

32. A method as in claim 31, in which step (d) further comprises re-activating a power saving mode that was previously inactivated in response to removal of a power saving mode having higher mode priority according to the predetermined mode hierarchy.

33. A method as in claim 31, in which:

the computer comprises a cover, and a switch activated by the cover;

step (a) comprises receiving a first input signal when the cover is closed and a second input signal when the cover is open;

the first and second input signals designate a first power saving mode and a second power saving mode respectively; and said first power saving mode has a higher mode priority than said second power saving mode relative to the predetermined mode hierarchy.

34. A method as in claim 33, in which said first power saving mode has a highest relative mode priority, and said second power saving mode has a lowest relative mode priority.

35. A method as in claim 29, in which:

the computer comprises a display; and one of said operating functions comprises a display power level.

36. A method as in claim 29, in which:

the computer comprises a display; and one of said operating functions comprises a display grey scale level.

37. A method as in claim 29, in which:

the computer comprises a display; and one of said operating functions comprises generation of a display synchronization signal.

38. A method as in claim 29, in which:

the computer comprises a liquid crystal display; and one of said operating functions comprises generation of liquid crystal back illumination.

39. A method as in claim 29, in which one of said operating functions comprises a generation of clock pulse frequency.

*40. A display controller that provides driving signals for a display apparatus, said display controller comprising:*

*a power saving controller, said power saving controller comprising:*

*a register having multiple, independently addressable register levels,*

*at least two of said register levels defining at least two externally programmable power saving modes respectively,*

*at least a remaining one of said register levels defining a hardware-activated power saving mode,*

*each of said power saving modes controlling a plurality of power-consuming functions of said display controller, and wherein*

*each of said plurality of power-consuming functions of said display controller are individually enabled or disabled when a current one of said power saving modes is selected according to a predetermined mode hierarchy and an external input comprising at least one of a user input received from an input device and a hardware state change depending on the contents of said register.*

* * * * *